May 9, 1939.    W. LE CLAIRE    2,157,615
COMPRESSION APPARATUS
Filed Jan. 29, 1938    3 Sheets-Sheet 1

INVENTOR
William Le Claire
BY Nathaniel Frucht
ATTORNEY

May 9, 1939.  W. LE CLAIRE  2,157,615
COMPRESSION APPARATUS
Filed Jan. 29, 1938  3 Sheets-Sheet 2

INVENTOR
William Le Claire
BY Nathaniel Frucht
ATTORNEY

May 9, 1939.  W. LE CLAIRE  2,157,615
COMPRESSION APPARATUS
Filed Jan. 29, 1938  3 Sheets-Sheet 3
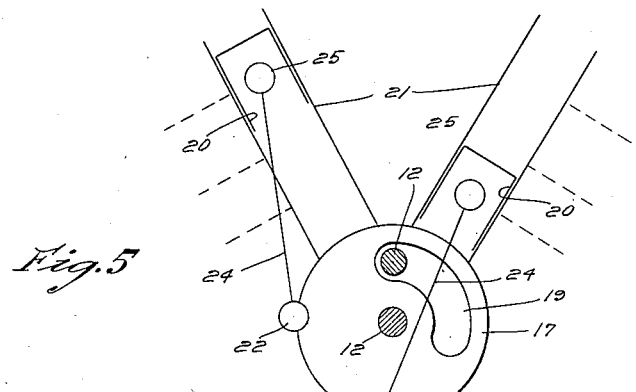
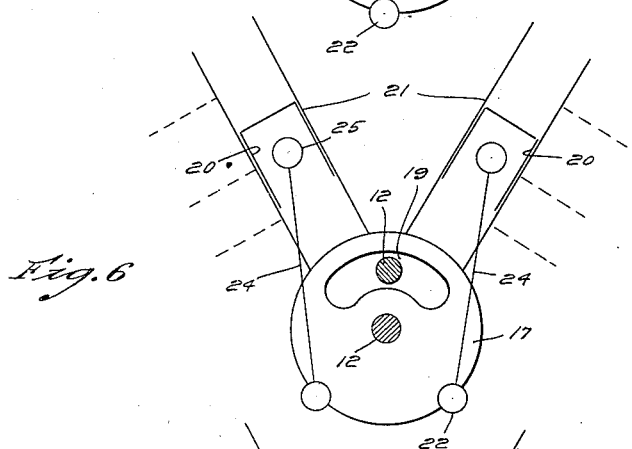
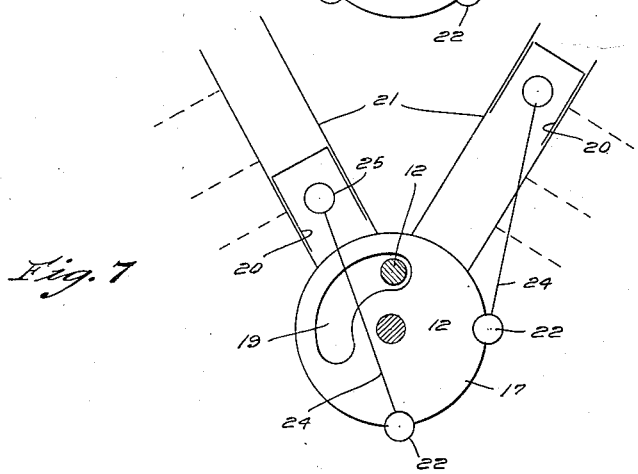

Patented May 9, 1939

2,157,615

UNITED STATES PATENT OFFICE 2,157,615

COMPRESSION APPARATUS

William Le Claire, Roundup, Mont.

Application January 29, 1938, Serial No. 187,702

3 Claims. (Cl. 230—49)

My present invention relates to compression apparatus, and has particular reference to air compressors.

It is the principal object of my invention to provide an air compressor having a common piston chamber and two pistons with relative differential movement.

It is a further object of my invention to utilize a novel mechanical movement for effecting the differential movement of the pistons.

An additional object of my invention is to utilize the compression pressure produced by one piston as a power pressure for the other piston.

Another object of my invention is to utilize a fluid controlled auxiliary air compressor, operated by the differential movements of the pistons.

An additional object of my invention is to provide a novel apparatus consisting of a small number of readily manufactured and easily assembled parts, which operate with relatively small friction losses and which produce a maximum air compressive effect at a low operating cost.

With the above and other objects and advantageous features in view, my invention consists of a novel arrangement of parts more fully disclosed in the detailed description following, in conjunction with the accompanying drawings, and more specifically defined in the appended claims.

Figs. 5, 6, and 7 are diagrammatic views of the relative piston movements.

It has been found desirable to utilize a differential piston movement for operating an air compressor. I have devised a novel apparatus, utilizing two cylinders which are positioned at an acute angle to each other, and communicating with a common fluid reservoir, the reservoir acting as a fluid base for a fluid actuated air compressor; I have further provided a novel actuating mechanism for the pistons, by utilizing eccentric operated oscillator shafts which oscillate a rotary cam to which the piston rods are connected, whereby there is a differential movement of the two pistons, the compression pressure resulting from the compression stroke of one piston assisting the withdrawing movement of the other piston and thus tending to balance the operating stresses.

Figure 1:
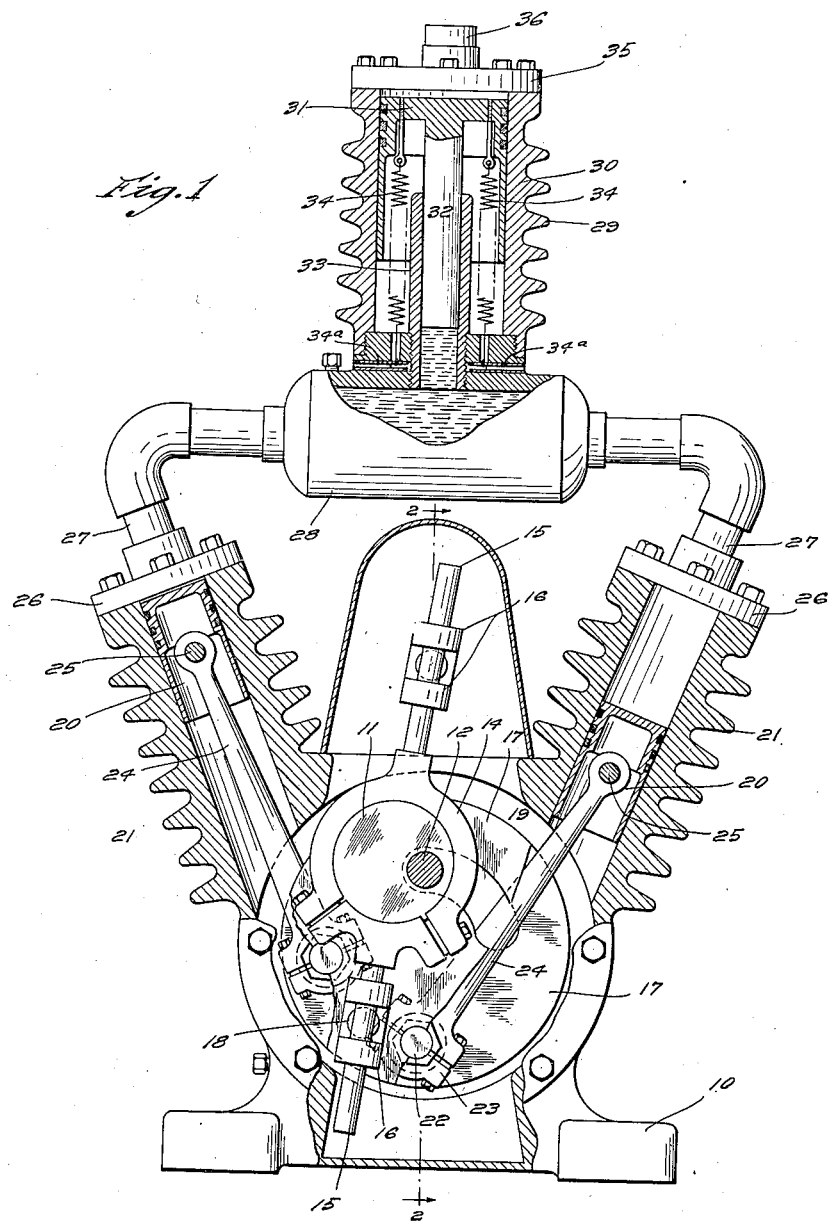
Fig. 1 is an elevation of the novel compressor, parts being in section and parts broken away.
Figure 2:
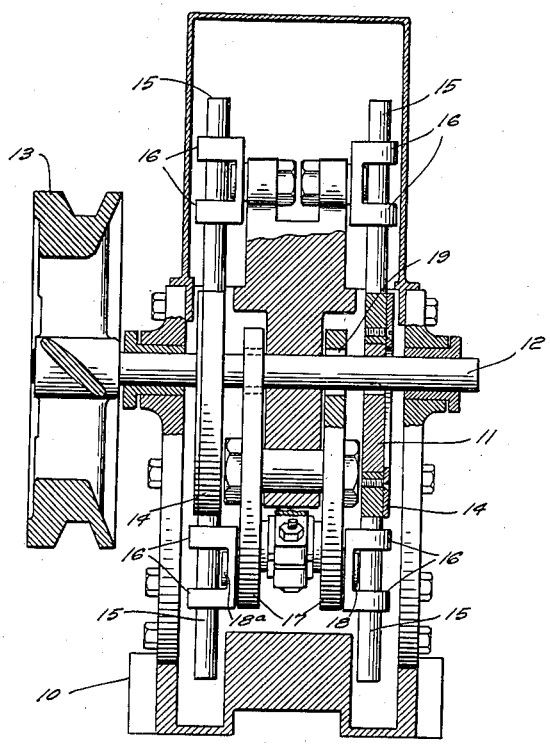
Fig. 2 is a section on the line 2—2 of Fig. 1.
Figure 3:
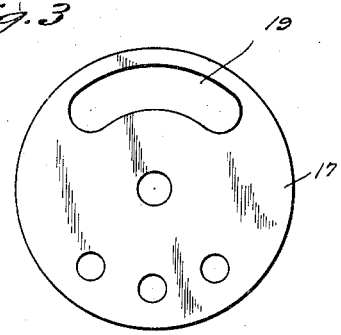
Fig. 3 is a plan view of the auxiliary compressor top, partly broken away, showing the air inlet and outlet valves.
Figure 4:
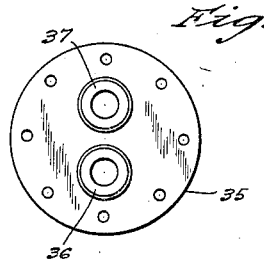
Fig. 4 is a detail of the oscillating cam plate.

My improved mechanism, see Fig. 1, includes a base housing 10 in which are positioned spaced eccentrics 11 keyed to the power shaft 12, the power shaft having a fly-wheel 13; the eccentrics in turn actuate split yokes 14 having oscillating stub shafts 15 which slide in bearings 16 pivotally secured to the cam plates 17 and to the frame, by means of pivot pins 18, and 18a respectively, the cam plates having arcuate slots 19 to accommodate the power shaft, and being pivotally connected to the pistons 20 in the angularly disposed cylinders 21 by means of pins 22, split bushings 23, piston rods 24 and wrist pins 25.

The inner ends of the cylinders are open to the crank case space in the housing 10, and the upper ends are closed by end plates 26, these plates having passageways connected by conduits 27 to a central fluid reservoir 28. The two cylinders are preferably positioned at an angle of approximately 30° to the vertical, whereby the fluid reservoir may be positioned above the housing 10 to provide a compact operating unit. Positioned above the fluid reservoir is an auxiliary air compressor unit 29, comprising a cylinder 30 with a piston 31, the piston being of the double type and having an inner plunger 32 seated in a cylinder 33 in free communication with the fluid reservoir; springs 34 are provided to assist in keeping the piston downwardly against the fluid pressure, the lower ends of the springs 34 being held in place by split ends of exhaust tubes 34a. The closure top plate 35 is provided with spring pressed air inlet and outlet check valves 36, 37, of standard type, the outlet check valve being positioned in an outflow passage leading to an air supply tank, not shown. The reservoir and the communicating chambers and passages are filled with liquid, preferably a medium oil.

As the compressor operates, the pistons force the oil upwardly on their compression strokes to lift the piston 31 and thus compress the air in the auxiliary compressor cylinder, and force the compressed air past the outlet check valve; the piston 31 moves down under the influence of the vacuum produced by the withdrawal strokes of the pistons, assisted by the springs 34, and thus causes an intake of atmospheric air through the inlet check valve.

Referring now to Figs. 5, 6 and 7, Fig. 6 shows the position of the pistons on the withdrawal stroke; at this point, one piston is ascending, see Fig. 5, and the other piston is still descending, but the novel operating mechanism produces a differential movement, whereby the ascending piston moves at a greater speed than the descending piston, and thus produces a compressive pressure on the oil to actuate the auxiliary air compressor. As the cam plate reaches its limit of oscillation, and begins its return stroke, the pistons return to the position shown in Fig. 6, whereby the compressive force on the oil is relieved and the auxiliary piston can descend; the second piston now moves into its compressing position, see Fig. 7, and the cycle is repeated. Since the pressure in both cylinders is always the same, the compression pressure produced by the compression stroke of one piston acts downwardly on the other piston which is on its withdrawal stroke, thus balancing the pressures and reducing the outside power required for the compression stroke.

While I have described a specific constructional embodiment of my invention, it is obvious that changes in the size and shape of the parts, and in the relation and setting, of the cylinders and the specific mechanism for actuating the pistons and other parts, may be made to suit the requirements for different compressor systems, without departing from the spirit and the scope of the invention as defined in the appended claims.

I claim:

1. In an air compressor, two compressors and a fluid reservoir, the cylinders of said compressors and the reservoir being in free communication, means for reciprocating the pistons in said cylinders at a differential rate to produce a periodic variation in the fluid pressure in said reservoir, and an auxiliary air compressor operated by flow of fluid from said reservoir, said auxiliary air compressor comprising a piston movable by fluid pressure in one direction and yieldingly urged in the opposite direction.

2. In an air compressor, two compressors and a fluid reservoir, the cylinders of said compressors and the reservoir being in free communication, means for reciprocating the pistons in said cylinders at a differential rate, and an auxiliary air compressor operated by flow of fluid from said reservoir, said auxiliary air compressor comprising a cylinder housing a movable piston, said piston having a piston rod, said cylinder having a bore slidably receiving said piston rod and in open communication with said reservoir to move said piston in one direction by pressure fluid from said reservoir, and means for yieldingly urging said piston in the opposite direction.

3. In an air compressor, two compressors and a fluid reservoir, the cylinders of said compressors and the reservoir being in free communication, means for reciprocating the pistons in said cylinders at a differential rate including a power shaft, eccentrics operated thereby, and oscillating cam plates connected to the pistons and operatively actuatable by said eccentrics, and an auxiliary air compressor operated by flow of fluid from said reservoir, said auxiliary air compressor comprising a piston movable by fluid pressure in one direction and yieldingly urged in the other direction.

WILLIAM LE CLAIRE.